US006270399B2

(12) United States Patent
Gunn

(10) Patent No.: US 6,270,399 B2
(45) Date of Patent: Aug. 7, 2001

(54) TONGUE AND GROOVE PANEL SIZING APPARATUS

(76) Inventor: Dalen Eugene Gunn, 3390 W. Hayden Ave., Rathdrum, ID (US) 83858

( * ) Notice: Subject to any disclaimer, the term of this patent is extended or adjusted under 35 U.S.C. 154(b) by 0 days.

(21) Appl. No.: 09/759,413

(22) Filed: Jan. 12, 2001

Related U.S. Application Data

(63) Continuation-in-part of application No. 09/390,206, filed on Sep. 7, 1999.

(51) Int. Cl.[7] ..................... B23F 21/03

(52) U.S. Cl. ..................... 451/557; 451/524

(58) Field of Search ..................... 451/557, 558, 451/522, 523, 524, 525; 81/45; 7/124, 158, 167, 169, 170

(56) References Cited

U.S. PATENT DOCUMENTS

| | | |
|---|---|---|
| 769,191 | 9/1904 | Grabowski . |
| 849,681 | 4/1907 | Hauver . |
| 1,114,903 | 10/1914 | Moore . |
| 1,148,552 | 8/1915 | Tingle . |
| 1,195,297 | 8/1916 | Vlchek . |
| 3,155,997 | 11/1964 | Gallagher . |
| 3,310,826 | 3/1967 | Ellis . |
| 3,820,185 | 6/1974 | Phillips . |
| 4,930,177 | 6/1990 | Rastutis . |
| 5,638,570 | 6/1997 | Gruner . |
| 5,823,719 | 10/1998 | Tyler . |
| 5,997,221 | 12/1999 | Sadler . |

*Primary Examiner*—Timothy V. Eley
*Assistant Examiner*—Dung Van Nguyen
(74) *Attorney, Agent, or Firm*—Gene Scott-Patent Law & Venture Group

(57) ABSTRACT

A hand tool is used for resizing bent, broken, warped or swollen tongue-in-groove panels or planks or boards. The tool has cutting tools mounted on its sides so as to be inserted into a groove for cutting the groove to size or opposing cutting surfaces for sizing a tongue. The tool is fastened by a simple clamp or clamps and has a handle for manipulation.

6 Claims, 2 Drawing Sheets

TONGUE AND GROOVE PANEL SIZING APPARATUS

This application is a continuation in part of application Ser. No. 09/390,206 filed Sep. 7, 1999 and which is copending with this application.

BACKGROUND OF THE INVENTION

1. Field of the Invention

This invention relates generally to hand tools, and more particularly to a hand tool with features for sizing and resizing the tongue and groove features of construction panels and boards.

2. Description of Related Art

The following art defines the present state of this field

Sipe et al., U.S. Pat. No. 769,191 provides in a channeling-tool, a body, side flanges extending upward from the body, the side flanges provided with grooves upon their inner faces, the grooves being inclined downward and forward, a knife arranged within the grooves and extending between the side flanges, a screw extending transversely from one side flange to the other for binding the knife in place, the depth of the cut being regulated by the distance the knife protrudes from the lower and forward end of the body a horizontal adjustable guide carried by the body underneath the knife adapted to travel in contact with the edge of the leather and regulate the distance of the cut from the edge and a handle secured to the body and extending rearwardly therefrom. This patent does not teach the use of laterally extending and opposing work tools for tongue and for groove surfacing.

Hauver, U.S. Pat. No. 849,681 describes a stock having a curved bearing-surface and with a transverse guideway near the bearing-surface, and operating-handle extending from the stock at one end, a head member adjustable disposed through the guideway and provided with transverse sockets, cutters adjustably disposed in said sockets with their operating ends extending in advance of the bearing-face of the stock, means for adjustably securing the head in the guideway and means for adjustably securing the cutters in the sockets.

Moore, U.S. Pat. No. 1,114,903 describes a reefing tool which comprises a handle with an integral head laterally extended and bifurcated at the extremity, and with a vertical blade adapted to enter and to be guided by a seam. This patent does not teach the use of laterally extending and opposing work tools for tongue and for groove surfacing.

Tingle, U.S. Pat. No. 1,148,552 describes a tool or implement for stepping a tire casing in repairing blow-outs, comprising a shank provided with a guide member, and a cutter-blade connected with the guide member and extending below the same with the guide member extending upon opposite sides of the cutter-blade for substantial distances. This patent does not teach the use of laterally extending and opposing work tools for tongue and for groove surfacing.

Vlchek, U.S. Pat. No. 1,195,297 describes a mortar joint scraper comprising a blade of plate material, scraper fingers projecting from the edges of the blade, and a handle supporting the blade whereby the blade takes a vertical position with relation to the face of a wall and the edges of the blade service as scrapers and guides. This patent does not teach the use of laterally extending and opposing work tools for tongue and for groove surfacing.

Gallagher, U.S. Pat. No. 3,155,997 describes a tool for raking out and smoothing mortar joints of masonry walls, a straight handle portion of flat relatively wide strap metal of rectangular cross section having one end of gooseneck shape terminating in a relatively narrow rake-out tongue with flared shoulders formed at an angle of about 45 degrees, the other end of the tool having a shank of the width of the rake-out tongue bent at substantially right angles to the handle portion in the same direction as the gooseneck end of the tool is bent and a trowel portion of approximately the width of the mortar joint integral with said shank extending from said shank at right angles substantially parallel to and spaced from the handle portion of the tool to dispose the handle at an angle to avoid contact of the hand with the wall. This patent does not teach the use of laterally extending and opposing work tools for tongue and for groove surfacing.

Ellis, U.S. Pat. No. 3,310,826 describes a golfer's cleaning tool comprising an elongated blade member including a substantially flat central portion, a first end portion extending at an obtuse angle out of the plane of said central portion and terminating in a bifurcated shoe cleat cleaning extremity characterized by a substantially V-shaped opening between two relative blunt points, a second end portion extending arcuately from the plate of said central portion in a direction opposite to said first end portion and terminating in a relatively blunt point adapted for cleaning the junction between the sole and upper of a golfer's shoe, said second end portion having an opening therein adapted to receive a suspension device, and a pair of oppositely disposed reverted wing members each comprising a side portion extending in substantially perpendicular relation to an edge of said central portion, and an inwardly extending portion overlying said central portion and substantially parallel thereto, each inwardly extending portion terminating in a straight edge, said straight edges terminating in spaced opposed relation to each other to provide scraper blades adapted for the removal of mud from the golfer's shoes, said reverted wing portion extending from a longitudinal second portion, and terminating at a longitudinal point on said central portion spaced from said first end portion to provide auxiliary oppositely disposed scraping edges on the sides of said central body portion. This patent does not teach the use of laterally extending and opposing work tools for tongue and for groove surfacing.

Phillips, U.S. Pat. No. 3,820,185 describes a device for cleaning barbecue grills comprising a blade having a slot therein adapted to engage the grill rods. The blade is preferably twisted to facilitate pivoting the slot about the grill rods to clean the under surfaces thereof, and the blade may have two slots one an open slot at the tip thereof and one a closed slot set back from the tip, to enable cleaning of different sized grill rods. If the blade has two lots therein, the tip of the blade must be bent over just behind the scraping surface of the closed slot to permit engagement of the closed slot with the grill rods. In this case the closed slot is also preferably formed with an enlargement immediately behind the bend at the front of the slot, and the blade is preferably bent back near the opposite end of the closed slot. This patent does not teach the use of laterally extending and opposing work tools for tongue and for groove surfacing.

Rastutis, U.S. Pat. No. 4,930,177 describes a scraping tool for removing paint residue from the friction seal of paint cans. The tool includes a handle of sufficient size to accommodate a human hand from which one of two scraping blades continue. Extending from the fore end of the tool is a rim scraping blade while conversely extending from the aft end is a lid scraping blade. The blades have contour edges shaped to approximate the cross sectional configuration of the rim and lid components of a paint can friction seal. The seal is cleaned completely, as the tool is designed to address both the rim and lid. Due to slightly smaller or larger blade dimensions, in respect to the seal configuration, the tool is allowed to move without encumbrance over the seal surface as it is cleaned. The blades are shaped to correspond specifically to the surfaces of the friction seal, permitting the tool to be used on assorted sizes of the cans as well as those of various manufacture.

Gruner, U.S. Pat. No. 5,638,570 describes a tool for scraping material from a bullnose installed on a corner joint of a drywall installation including an elongated device having a handle portion, a first end portion, a second end portion, and a size adapted for holding in one hand. The first end portion has a first convexly shaped edge that matches a concavely shaped portion of the bullnose. It enables a user to scrape the material from the bullnose by moving the convexly shaped edge along the concavely shaped portion of the bullnose. Preferably, the first concavely shaped edge is shaped in a 75-degree arc of 0.875 inch radius to match a convextly shaped portion of the bullnose when the bullnose is installed on a 90-degree corner joining, and the second end portion of the elongated device includes a second convexly shaped edge that is shaped in a 50-degree arc of 1.125 inch radius to match the concavely shaped portion of the bullnose when the bullnose is installed on a 135-degree corner joint. One embodiment takes the form of a 6.5 inch long aluminum bar having the specified shape. This patent does not teach the use of laterally extending and opposing work tools for tongue and for groove surfacing.

Tyler, U.S. Pat. No. 5,823,719 describes a rasp tool for smoothing the rough edges of cut drywall and the like including an elongated housing which is substantially U-shaped in cross-section and which defines a pair of legs disposed spaced relative to one another with each leg defining a distal end. A pair of slots extend along the inside surface of each of the legs longitudinally relative to the housing and parallel relative to each other. The housing further supports a rasp blade with the edges of the blade removably received in the pair of slots such that the blade is spaced from the distal ends of the legs so as to define slide guides on the inside surface of each of the legs. This patent does not teach the use of laterally extending and opposing work tools for tongue and for groove surfacing.

Sadler, U.S. Pat. No. 5,997,221 describes a rasp formed for removing material at a cut edge of a structure, such as drywall cut to size. Unlike prior drywall rasps, the rasp of the invention is formed with a rigid, channel-shaped grip defining a generally U-shaped, downwardly facing, concave inner channel surface. A rectangular section of expanded metal that forms a grid with a multiplicity of grid openings delineated from each other by a lattice of intervening metal strips is placed into the channel-shaped backing or grip. Lips at the lower extremities of the channel walls are bent upwardly and inwardly to clamp the sheet of expanded metal against the inner surface of the grip. The sheet of expanded metal is thereby permanently secured against the inner surface of the grip. The sheet of expanded metal is bent to conform to the interior surface of the grip. The channel-shaped structure of the rasp is then run along the cut surface of a structure to be finished so as to abrade away material therefrom. Because the rasping element is disposed against the concave, channel-shaped, inner surface of the grip, there is a minimal likelihood of accidental contact between the expanded metal abrading element and anything other than a narrow edge of sheet material purposely inserted into the channel-shaped structure of the rasp. The rasp thereby greatly reduces the likelihood of accidental injury to the user. This patent does not teach the use of laterally extending and opposing work tools for tongue and for groove surfacing.

Meier, WO97/44551 describes a tool for cleaning joints before they are filled with jointing compound, taking the form either of a plate-like handles or material-saving frames with at least one straight side from which projects a cleaning projection fitting into the joint to be cleaned, or as a handle section with interchangeable cleaning attachments. This patent does not teach the use of laterally extending and opposing work tools for tongue and for groove surfacing.

The prior art teaches many hand tools for smoothing, plaining, sanding and other steps in the art of woodworking where fitting or engaging of the elements of a workpiece is required. However, the prior art fails to teach that a hand tool for resize tongue and groove features on planks and boards. The present invention fulfills these needs and provides further related advantages as described in the following summary.

SUMMARY OF THE INVENTION

The present invention teaches certain benefits in construction and use which give rise to the objectives described below.

A hand tool is used for resizing bent, broken, warped or swollen tongue-in-groove panels or planks or boards. The tool has cutting tools mounted on its sides so as to be inserted into a groove for cutting the groove to size or for smoothing a tongue. The tool is fastened by a simple clamp or clamps and has a handle for manipulation.

A primary objective of the present invention is to provide a hand tool having advantages not taught by the prior art.

Another objective is to provide such a tool that is of simple and compact construction, is easily used and inexpensive to manufacture and assemble.

A further objective is to provide such a tool that is highly efficient in resizing tongue and groove features on planks and boards.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
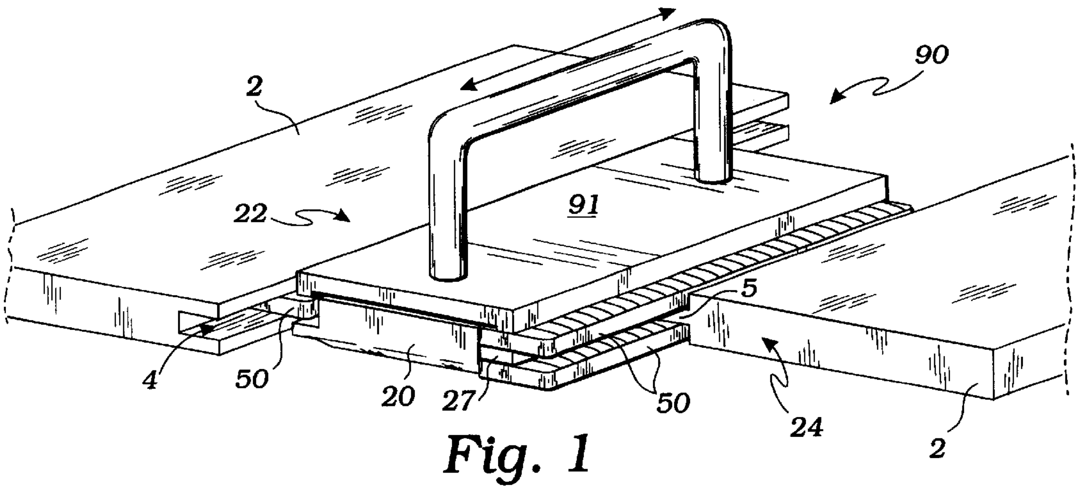
FIG. 1 is a perspective view of a first preferred embodiment of the present invention.
Figure 2:
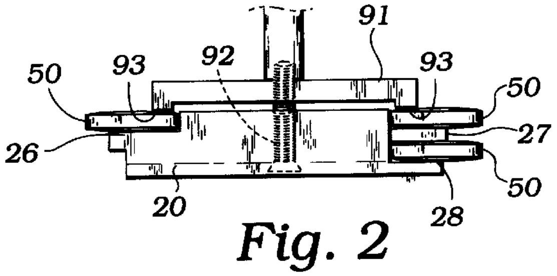
FIG. 2 is a partial end elevational view thereof.
Figure 3:
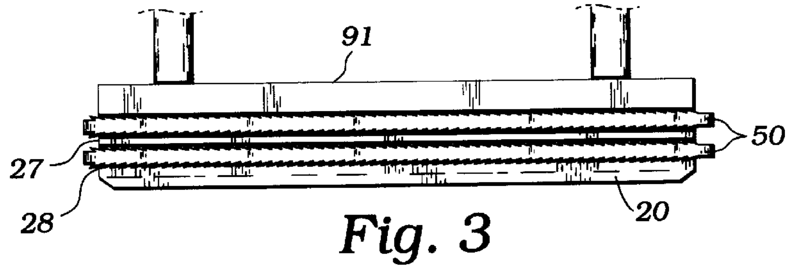
FIG. 3 is a partial right side elevational view thereof.
Figure 4:
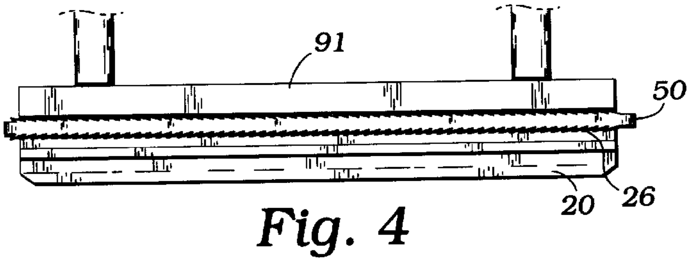
FIG. 4 is a partial left side elevational view thereof.
Figure 5:
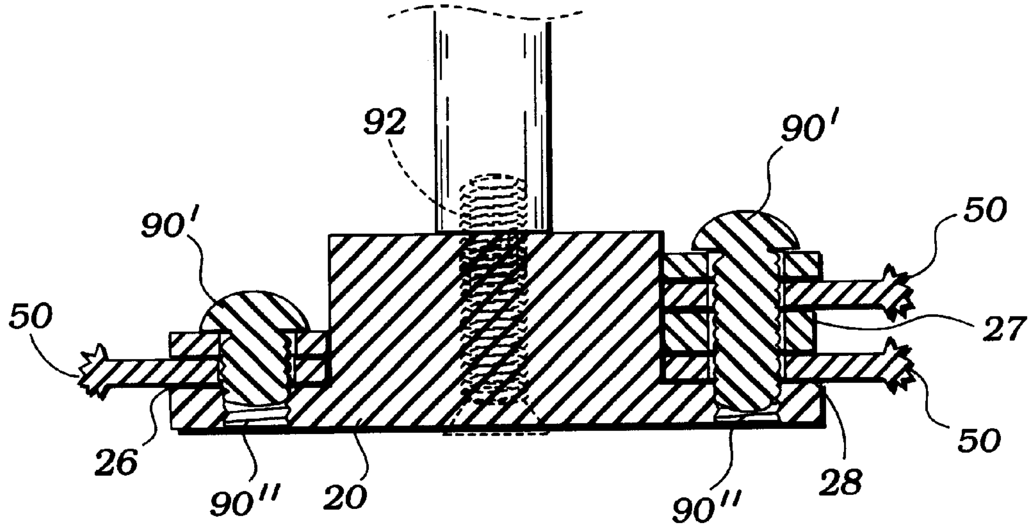
FIG. 5 is a sectional view of a further embodiment thereof.

The above described drawing figures illustrate the invention, a hand tool apparatus for sizing and for resizing tongue and groove panels and boards 2. In a first embodiment, shown in FIGS. 1–4 a tool body 20 provides a pair of opposing tool sides 22 and 24. These sides 22, 24 each provide a protruding portion or shelf as best seen in FIG. 2. The protruding portions of the tool sides 22, 24 provide respective tool resting surface 26 and 28. One of the tool resting surfaces 28 supports a pair of cutting tools 50 such as the rasps shown, but the cutting tools 50 may be any other type of wood cutting or smoothing tool such as a blade or a carbide edged tool, etc. The cutting tools 50 are spaced apart in parallel positions by a cutting tool spacer 27. The other tool resting surface 26 supports a further cutting tool 50, as shown in the figures. The cutting tools 50 extend in opposing lateral directions from the tool sides 22, 24 and extend outwardly beyond the protruding portions. Thus, the tools 50 may be used to smooth panel board tongues 5 on both their top and bottom surfaces and panel board grooves 4, also on top and bottom internal surfaces, as shown in FIG. 1. A clamping means 90 holds the cutting tools 50 on each side of the tool body 20 fixedly in place by applying pressure through the cutting tools 50 to the respective tool resting surfaces 26 and 28 so as to rigidize the apparatus, i.e., so that the cutting tools 50 cannot shift during wood smoothing operations. A screw or screws 92 are used to fasten the assembly together as shown in FIGS. 2 and 5. As shown in FIG. 5, the clamping means 90' may comprise a plurality of threaded fasteners engaged with a corresponding plurality of threaded receiving holes 90" in the respective opposing tool resting surfaces 26, 28 so as to apply clamping forces directly to the cutting tools. As shown in FIG. 2, the clamping means may comprise a clamping plate 91 providing a pair of spaced apart clamping surfaces 93 positioned for pressing directly onto the cutting tools 50 or intermittent spacer bars, as shown.

In an alternate embodiment the present invention comprises the combination tool as described above with one or more panels 2 having tongue and groove construction. This combination comprises the tool and workpiece together.

In use, the present invention is used to smooth and resize the tongue 5, or the groove 4 of the board or panel 2 as shown in FIG. 1. The apparatus is preferably constructed such that the cutting tools 50 on the side of the tool used for sizing the groove 4 is of the necessary thickness to control the groove width within proper tolerance as the tool is drawn along the groove. Also, on the side of the tool used for sizing the tongue the two opposing and spaced apart cutting tools are preferably spaced as necessary to achieve a proper tongue thickness when the tool is drawn along the tongue.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A hand tool apparatus for sizing and resizing tongue and groove panels and boards, the apparatus comprising: a tool body providing a pair of opposing tool sides, each of the tool sides including a tool side surface; one said tool side surface supporting a pair of cutting tools separated by a cutting tool spacer positioning the cutting tools in spaced-apart positions for enabling a tongue of a panel to be inserted therein, and in parallel with the one said tool side surface, the cutting tools extending laterally relative to the tool side surface; the other said tool side surface supporting a further cutting tool, the further cutting tool extending laterally relative to the other tool side surface for contacting opposing surfaces of a panel groove, the lateral dispositions of the pair of cutting tools and the further cutting tool being in opposition and resting in parallel planes; and a clamping means enabled for applying clamping forces to the pair of cutting tools and the cutting tool spacer against the one tool side surface, and the further cutting tool against the other tool side surface so as to rigidize the apparatus.

2. The apparatus of claim 1 wherein the clamping means comprises a plurality of threaded fasteners engaged with a corresponding plurality of threaded receiving holes in the pair of opposing tool sides for applying clamping forces directly to the cutting tools.

3. The apparatus of claim 1 wherein the clamping means comprises a clamping plate providing a pair of spaced apart clamping surfaces positioned for pressing directly onto the cutting tools.

4. A combination hand tool apparatus and tongue and groove panel, the combination comprising: at least one tongue and groove panel, and a hand tool having a tool body providing a pair of opposing tool sides, each of the tool sides including a tool side surface; one said tool side surface supporting a pair of cutting tools separated by a cutting tool spacer positioning the cutting tools in spaced-apart positions, and in parallel with the one said tool side surface, the cutting tools extending laterally outwardly relative to the one tool side surface for contacting opposing surfaces of a tongue of the at least one panel; the other said tool side surface supporting a further cutting tool resting on the other said tool side surface, the further cutting tool extending laterally outwardly relative to the other tool side surface for contacting opposing surfaces of a panel groove of the at least one panel; and a clamping means enabled for applying clamping forces to the pair of cutting tools and the cutting tool spacer against the one tool side surface, and the further cutting tool against the other tool side surface so as to rigidize the hand tool.

5. The apparatus of claim 4 wherein the clamping means comprises a plurality of threaded fasteners engaged with a corresponding plurality of threaded receiving holes in the pair of opposing tool sides for applying clamping forces directly to the cutting tools.

6. The apparatus of claim 4 wherein the clamping means comprises a clamping plate providing a pair of spaced apart clamping surfaces positioned for pressing directly onto the cutting tools.

* * * * *